(12) United States Patent
Sasaki et al.

(10) Patent No.: US 6,187,449 B1
(45) Date of Patent: *Feb. 13, 2001

(54) FOOD PACKAGING STRETCH FILM

(75) Inventors: Hideki Sasaki; Kenji Nakamura, both of Nagahama (JP)

(73) Assignee: Mitsubishi Plastics, Inc., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/578,510

(22) Filed: Dec. 26, 1995

(51) Int. Cl.⁷ .............................. C08L 25/10; B32B 27/32
(52) U.S. Cl. .......................... 428/517; 428/519; 428/521; 525/88; 525/240; 525/241
(58) Field of Search ...................... 428/515, 516, 428/517, 518, 519, 521; 525/240, 241, 88

(56) References Cited

U.S. PATENT DOCUMENTS 5,034,087 * 7/1991 Hodgson, Jr. et al. ................. 156/85
5,085,927 * 2/1992 Dohrer ................................. 428/220

FOREIGN PATENT DOCUMENTS

WO 94/17113    8/1994   (WO) .

* cited by examiner

*Primary Examiner*—Paul Thibodeau
*Assistant Examiner*—D. Lawrence Tarazano
(74) *Attorney, Agent, or Firm*—Oblon, Spivak, McClelland, Maier & Neustadt, P.C.

(57) ABSTRACT

A food packaging stretch film made of a resin containing substantially no chlorine and having a storage modulus (E') of from $5.0 \times 10^8$ to $5.0 \times 10^9$ dyn/cm² and a loss tangent (tan δ) of from 0.2 to 0.8, as measured by dynamic viscoelasticity measurement at a frequency of 10 Hz at a temperature of 20° C.

5 Claims, No Drawings

FOOD PACKAGING STRETCH FILM

The present invention relates to a stretch film to be used for food packaging. Particularly, it relates to a stretch film made of a material containing substantially no chlorine.

Heretofore polyvinyl chloride type films have been mainly used as so-called prepackaging stretch films to wrap fruits, meats or vegetables placed on light weight trays. Such polyvinyl chloride type films have not only properties suitable for packaging, such as good packaging efficiency and neat packaging finish, but also superiority in the product quality admitted by both distributors and consumers such that they are excellent in the elastic recovery to regain the initial shape even when deformed e.g. by a finger upon wrapping, they are excellent in the bottom sealing property, and peeling of films during transportation or display of wrapped products scarcely takes place, and thus the commercial value of the wrapped products can be maintained.

However, problems such as generation of hydrogen chloride gas during incineration and elution of plasticizers contained in large amounts, have been pointed out against the polyvinyl chloride films. Accordingly, various studies have been made on materials to be substituted for the polyvinyl chloride films. Particularly, stretch films of various structures employing polyolefin type resins have been proposed. For example, stretched films having structures of e.g. an ethylene/vinyl acetate copolymer (EVA), EVA/polybutene-1/EVA and EVA/linear ethylene-α-olefin copolymer/EVA have been proposed.

However, it has been difficult to satisfy all of the required properties such as the packaging efficiency, packaging finish, elastic recovery and bottom-sealing property. Further, a non-vinyl chloride type stretch film having EVA laminated on each side of a layer of a hydrogenated product of a styrene/butadiene block copolymer, has also been proposed (Japanese Examined Patent Publication No. 59622/1993), but such a film is not fully satisfactory with respect to the packaging efficiency, the packaging finish and the bottom sealing property, although it has a merit that the elastic recovery against deformation is good.

Under the circumstances, the present inventors have conducted extensive studies and as a result, have succeeded in obtaining a non-vinyl chloride type stretch film excellent in the above-mentioned various properties.

Thus, the present invention provides a food packaging stretch film made of a resin containing substantially no chlorine and having a storage modulus (E') of from $5.0 \times 10^8$ to $5.0 \times 10^9$ dyn/cm$^2$ and a loss tangent (tan δ) of from 0.2 to 0.8, as measured by dynamic viscoelasticity measurement at a frequency of 10 Hz at a temperature of 20° C.

Now, the present invention will be described in detail with reference to the preferred embodiments.

The stretch film of the present invention is made of a resin which contains substantially no chlorine.

The film of the present invention has a storage modulus (E') of from $5.0 \times 10^8$ to $5.0 \times 10^9$ dyn/cm$^2$ as measured by dynamic viscoelasticity measurement at a frequency of 10 Hz at a temperature of 20° C., and a loss tangent (tan δ) of from 0.2 to 0.8.

Heretofore, stretch films employing various non-vinyl chloride resins have been proposed. The present inventors have found that by imparting certain specific viscoelastic properties to a stretch film, the recovery behavior of the film when the film once stretched is permitted to recover upon release of the stress, will be the optimum behavior for stretch wrapping.

Here, if E' is less than $5.0 \times 10^8$ dyn/cm$^2$, the film is so soft that the stress against deformation tends to be too small, whereby the packaging efficiency tends to be poor, and the tension of the film upon wrapping tends to be insufficient. Accordingly, such a film is not suitable as a stretch film. On the other hand, if E' exceeds $5.0 \times 10^9$ dyn/cm$^2$, the film tends to be hard and poor in stretching, whereby deformation or crushing of trays is likely to be led.

If tan δ is less than 0.2, the recovery behavior against stretching of the film tends to be instantaneous, and the film tends to recover in a short period of time before it is folded back at the bottom of a tray, whereby the film may not be well stretched, and wrinkles are likely to form. Further, with respect to the heat sealing condition at the bottom, in the case of stretch wrapping, no adequate fusion by heat is usually conducted, whereby after wrapping, peeling of the bottom seal is likely to take place during the transportation or display. On the other hand, if tan δ exceeds 0.0, the packaging finish will be good, but the film tends to undergo plastic deformation, and the tension against an external force of the wrapped product tends to be so weak that during transportation or display, the film at the upper side of the tray tends to be slackened, for example, when wrapped products are piled up, whereby the commercial value of the wrapped products is likely to be impaired. Further, in an automatic wrapping, the film tends to be stretched in the longitudinal direction, whereby a problem such as chucking failure is likely to occur. A particularly preferred range of tan δ is from 0.30 to 0.60.

A stretch film may sometimes be used at low temperatures, and accordingly it is desired to have excellent low temperature characteristics (particularly low temperature stretchability). For this purpose, the storage modulus (E') of the film is preferably within a range of at most $1.5 \times 10^{10}$ dyn/cm$^2$ as measured by dynamic viscoelasticity measurement at a frequency of 10 Hz at a temperature of 0° C.

Various material may be mentioned as specific examples of the material satisfying the above viscoelasticity properties. One of them is a copolymer of a vinyl aromatic compound with a conjugated diene, or a hydrogenated derivative thereof, wherein the conjugated diene block has a glass transition temperature of at least −20° C. (The glass transition temperature will hereinafter be referred to simply as Tg.)

The copolymer of a vinyl aromatic compound with a conjugated diene, or a hydrogenated derivative thereof, usually has features such that it has rubber elasticity and is flexible and less susceptible to rupture, and it has excellent transparency. Further, by properly balancing the rigid nature inherent to the vinyl aromatic compound and the elastomeric nature inherent to the conjugated diene by selecting e.g. the polymerization mode, the object of the present invention can readily be accomplished. Here, as the vinyl aromatic compound, styrene is most typical, but o-styrene, p-styrene or α-methylstyrene may, for example, be also employed. As the conjugated diene, butadiene, isoprene or 1,3-pentadiene may, for example, be mentioned.

As conventional copolymers of this type, a styrene/butadiene block copolymer and a styrene/isoprene block copolymer are known, and some of them are practically used for films. However, conventional copolymers of this type which are commonly used have Tg on the side far lower than 0° C., usually around −50° C., and at normal temperatures, the loss tangent (tan δ) as described hereinafter, is very small.

Suitable for the present invention may, for example, be the one having a layer containing a block copolymer wherein the weight ratio of a vinyl aromatic compound to a conjugated diene is within a range of from 40/60 to 10/90, and Tg of the conjugated diene block is at least −20° C.

Specifically, it may be the one having a block prepared by random copolymerization of e.g. styrene to a conjugated diene, or the one having a tapered block having a conjugated diene block copolymerized with e.g. styrene with a certain concentration gradient.

Particularly preferred may, for example, be the one using, as the conjugated diene block, an isoprene block having a high 3,4-bond ratio. It is known that the higher the 3,4-bond (vinyl bond) ratio of the isoprene block, the higher Tg. In this sense, it is particularly effective for the present invention to use the one wherein the 3,4-bond ratio is at least 40%, particularly at least 50%.

As the copolymer of the vinyl aromatic compound with the conjugated diene, it is preferred to use the one having hydrogenation applied to the conjugated diene. By the hydrogenation, the cross-linking reaction during the film-forming process such as malt extrusion can be suppressed, and the compatibility when other components are mixed, will be improved, and further the transparency can be maintained. From this viewpoint, a suitable hydrogenation ratio is at least 50%, preferably at least 60%.

Also preferred is a film having a resin layer prepared by mixing a propylene type polymer to the above-mentioned copolymer of a vinyl aromatic compound with a conjugated diene, having high Tg. (Hereinafter, the copolymer of a vinyl aromatic compound with a conjugated diene may sometimes be referred to as "component (A)", and the propylene type polymer may sometimes be referred to as "component (B)").

Namely, when the copolymer of a vinyl aromatic compound with a conjugated diene having high Tg is used alone, if Tg is on a lower side (e.g. −10° C.) within the above range of Tg, the storage modulus (E') at 20° C. tends to be low, and the film tends to be soft, and if Tg is on a higher side, (e.g. +10° C.), the loss tangent (tan δ) tends to be too high, although the storage modulus (E') will be proper, whereby there will be a demerit that selection of the material will be practically limited, and the film strength tends to be inadequate. Accordingly, by incorporating component (B) (a propylene type polymer), the viscoelastic properties can be adjusted, and the film strength can be increased. The propylene type polymer has a merit in that even when it is mixed with component (A), the transparency will not be substantially impaired.

Here, the propylene type polymer is a polymer containing at least 70 mol % of propylene and may, for example, be polypropylene (homopolymer), a copolymer of propylene with ethylene or an α-olefin having from 4 to 12 carbon atoms, or a mixture thereof. If the propylene content is less than 70%, the crystallizability tends to be too low, whereby it tends to be difficult to accomplish adjustment of the viscoelastic properties or improvement of the strength of the film. Further, such material lacks in the film-forming stability.

In the present invention, it is preferred to use a propylene type copolymer having a relatively low crystallizability at least as a part of component (B).

Namely, a propylene typs polymer is usually highly crystalline and has high strength, and a large force is required for stretching it. Further, it shows only non-uniform stretchability. Such properties will remain even when it is made into a mixture. Therefore, in order to obtain a film having good stretchability, it is preferred to use a propylene copolymer having a low crystallizability at least as a part of the material. As a propylene copolymer in such a case is preferably the one having from about 3 to 30 mol % of ethylene or a $C_{4-12}$ α-olefin copolymerized to propylene.

The blend ratio of components (A) and (B) is adjusted so that the above viscoelastic properties can be obtained. The ratio is usually from 20 to 80 wt % of component (A) and from 80 to 20 wt % of component (B).

Another embodiment is a film having a mixed resin layer prepared by mixing a petroleum resin, a terpene resin, a cumarone-indene resin, a rosin resin or a hydrogenated derivative thereof, having high Tg (this component may hereinafter be referred to as "component (C)") to the copolymer of a vinyl aromatic compound with a conjugated diene.

Namely, if the copolymer of a vinyl aromatic compound with a conjugated diene is used alone, if Tg is low, the storage modulus (E') at 20° C. tends to be low, the film tends to be soft, and the loss tangent (tan δ) at 20° C. tends to be small, and if Tg is high, the tangent loss (tan δ) tends to be too high, although the storage modulus (E') will be proper. Accordingly, by incorporating component (C), it is possible to increase Tg of the entire resin mixture to a level close to room temperature by selecting Tg of component (C) and the blend ratio, and it is readily possible to accomplish the specific viscoelastic properties of the present invention, even when a copolymer of a vinyl aromatic compound with a conjugated diene having a relatively low Tg is used.

Here, the petroleum resin may, for example, be an aliphatic petroleum resin composed of cyclopentadiene or its dimer or an aromatic petroleum resin composed of $C_9$ fraction. The terpene resin may, for example, be a terpene resin from β-pinene or a terpene-phenol resin. The rosin type resin may, for example, be a rosin resin such as gum rosin or wood rosin, or an esterified rosin resin modified with glycerol or pentaerythritol.

Component (C) may have various Tg primarily depending upon the molecular weight. However, suitable for the present invention is the one having Tg within a range of from 50 to 100° C., preferably from 70 to 90° C. If Tg is less than 50° C., when mixed with the above component (A), component (C) is required to be incorporated in a large amount in order to obtain the viscoelastic properties which will be described hereinafter, whereby blocking of the film or the material due to its bleeding on the surface is likely to be result. Further, the mechanical strength of the overall film tends to be inadequate, and the film will be susceptible to rupture and practically disadvantageous.

On the other hand, if Tg exceeds 100° C., the compatibility with component (A) tends to be poor, and it tends to bleed out on the film surface as the time passes, which in turn leads to blocking or deterioration of the transparency.

The above component (C) is known to show relatively good compatibility when mixed to component (A). However, from the viewpoint of the color, the thermal stability and the compatibility, it is preferred to employ a hydrogenated derivative thereof.

For the above reason, the amount of component (C) to be incorporated should better be small within the range where the desired viscoelastic properties can be obtained. Accordingly, as component (A), it is advantageous to employ a resin having Tg of at least −20° C., and in such a case, the mixing ratio is usually from 60 to 90 wt % of component (A) and from 40 to 10 wt % of component (C).

Further, a mixed resin comprising three components (A), (B) and (C) is also a preferred material. In this case, the mixing ratio is preferably from 30 to 60 wt % of component (A), from 20 to 50 wt % of component (B) and from 10 to 40 wt % of component (C).

As another embodiment of the material suitable for the present invention, a mixed resin may be mentioned which comprises a low crystalline propylene type polymer, and a petroleum resin, a terpene resin, a cumarone-indene resin, a rosin type resin or a hydrogenated derivative thereof, having Tg of from 50 to 100° C. (The low crystalline propylene type polymer in this combination will hereinafter sometimes be referred to as "component (D)".)

Here, the low crystalline propylene type polymer is a single polymer or a mixture of two or more polymers selected from propylene type polymers such as crystalline polypropylene (homopolymer), a copolymer of propylene with ethylene or an α-olefin having from 4 to 12 carbon atoms, and non-crystalline polypropylene (atactic polypropylene), and it is a propylene type copolymer having a quantity of heat for crystallization of from 10 to 60 J/g as measured by a differential scanning calorimeter by cooling to 0° C. at a scanning rate of 10° C./min after fusing the crystal.

If the quantity of heat for crystallization is less than 10 J/g, the crystallizability tends to be too low, and the film-forming property tends to be very poor, and there will be a practical problem that at a room temperature, the film will be so soft that the strength will be inadequate. On the other hand, if the quantity of heat for crystallization exceeds 60 J/g, a large force will be required for stretching the film, and the stretching tends to be non-uniform, and consequently, such film will not be suitable for a stretch film.

As such a propylene type copolymer, the one having a high copolymerization ratio among the above-mentioned component (B) may, for example, be mentioned.

Here, if component (D) is used alone, Tg will usually be from −30° C. to 0° C., and tan δ at 20° C. will be as small as less than 0.1.

Accordingly, by incorporating the petroleum resin or the like, Tg of the mixture can be increased, and at the same time, the remaining crystallizability of component (D) can be lowered. The petroleum resin or the like may be the same as the above described component (C), i.e. the one having Tg of from 50 to 100° C. If Tg of component (C) is less than 50° C., the elasticity tends to be too low to obtain the desired viscoelastic properties for the overall film. On the other hand, if Tg exceeds 100° C., if the incorporated amount is small, the crystallizability of component (D) will remain, whereby the effect of incorporating component (C) will be small, and if the incorporated amount is large, the elasticity will increase with an increase of Tg, whereby stretchability necessary for stretch film will be impaired, although the crystallizability as the entire mixture will be low.

The blending weight ratio is preferably (D)/(C)=90/10 to 60/40.

As a further embodiment, a film having a layer containing a copolymer of a cyclic olefin and an α-olefin unit comprising ethylene as the main component, may be mentioned.

The α-olefin unit comprising ethylene as the main component is the one containing ethylene as the main component and, if necessary, a $C_3$–$C_8$ α-olefin unit. The cyclic olefin may, for example, be norbornene, 5-methylnorbornene, 5-ethylnorbornene, 5-propylnorbornene or 1-methylnorbornene. The cyclic olefin has high Tg as compared with an α-olefin, and by copolymerizing it with an α-olefin unit comprising ethylene as the main component, it is possible to lower-the-crystallizability while maintaining E', whereby the viscoelastic properties of the present invention can be obtained.

In order to obtain the viscoelastic properties of the present invention, the type and the copolymerization ratio of the cyclic olefin unit may be controlled within the specific ranges, two or more copolymers having different copolymerization ratios may be blended, or a third component may be copolymerized, to satisfy the above-mentioned E' and tan δ.

However, within the ranges where the above properties are satisfied, the crystallizability of the copolymer tends to be substantially low, and Tg may be not so high, whereby a demerit from the viewpoint of the production of the copolymer, such as blocking of pellets, may sometimes result. Accordingly, for the purpose of imparting flexibility by a plasticizing effect,.a polybutene having a low polymerization degree, or a styrene/butadiene/styrene block copolymer having a styrene content of at most 30 wt %, may be mixed in an amount of from 20 to 40 wt % to a copolymer having a copolymerization ratio of a cyclic olefin of about 50% and Tg of from 70 to 130° C., which is commonly available (which can not by itself provide the viscoelastic properties intended by the present invention).

A suitable material is a low polymerization degree polybutene with an average degree of polymerization of from 100 to 1000.

In addition to the material described above, it is possible to select a proper material by evaluating the viscoelastic properties of the material.

In the present invention, a stretch film having at least one layer containing the above described material, can be obtained. However, other non-vinyl chloride material layers may be laminated thereon as the case requires. As other resin layers, a polyolefin type polymer and a flexible styrene/butadiene elastomer may, for example, be mentioned. By laminating such layers, it is possible to impart stability of film-forming property, blocking resistance, an adhesive property, or a sliding property.

The polyolefin type polymer as a laminating material may, for example, be low density polyethylene, super low density polyethylene (copolymer of ethylene with an α-olefin), an ethylene/vinyl acetate copolymer (EVA), an ethylene/alkylacrylate copolymer, an ethylene/alkylmethacrylate copolymer an ethylene/acrylic acid copolymer, an ethylene/methacrylic acid copolymer, an ionomer of low density polyethylene or a propylene type elastomer material. From a practical viewpoint, EVA is, for example, preferably used. Such EVA is preferably the one having a vinyl acetate content of from 5 to 25 wt %, preferably from 10 to 20 wt % and a melt flow ratio (MFR) of from 0.2 to 2 g/10 min (190° C., 2.16 kg load) from the viewpoint of the strength, the flexibility and the film forming and processing properties.

The polyolefin type polymer as such a laminating material has small tan δ at 20° C. and by itself does not have the viscoelastic properties specified by the present invention. However, by laminating it in a proper thickness on the material as described above, the laminated film as a whole will be able to satisfy the viscoelastic properties as specified by the present invention.

The thickness of the film of the present invention is usually within a range commonly used for stretch packaging i.e. at a level of from 8 to 30 μm, typically within a range of from 10 to 20 μm.

The film of the present invention can be obtained by melt-extruding the material from an extruder and shaping it into a film form by inflation forming or T-die forming. In the case of a laminated film, it is advantageous to employ coextrusion by a multilayer die.

Practically, it is preferred to melt-extruding the material resin from a ring-shaped die, followed by inflation forming, whereby the blow up ratio (bubble diameter/die diameter) is set to obtain the above tensile properties depending upon the material and is usually at least 4, preferably within a range of from 5 to 7.

To the film of the present invention, various additives may be incorporated in order to impart properties such as an antifogging property, an antistatic property or a sliding property. For example, a surfactant such as a glycerol fatty acid ester, a polyglycerin fatty acid ester, a sorbitan fatty acid ester or an ethylene oxide adduct may suitably be incorporated.

Now, the present invention will be described in further detail with reference to Examples. The film properties and performance were measured and evaluated in accordance with the following methods.

1) E' and Tan δ

E' and tan δ were measured by means of a viscoelasticity spectrometer VES-F3, manufactured by Iwamoto Seisakusho K.K. in a transverse direction of a film at a frequency of 10 Hz and at a temperature of 20° C. or 0° C.

2) Glass Transition Temperature (Tg)

In the same method as above, the loss modulus (E") was measured by changing the temperature to determine the relation between E"and the temperature, and the peak temperature of E"was taken as Tg.

3) Stretch Packaging Properties

Using a stretch film with a width of 350 mm, a foamed polystyrene tray (length: 200 mm, width: 130 mm, height; 30 mm) was wrapped by an automatic wrapping machine (ISHIDA.Wmin MK-II, manufactured by Ishida Koki K.K.), and evaluation was made with respect to items as identified in Table 2. Using the same film and tray, a wrapping test was carried out by means of a manual wrapping machine (Diawrapper A-105, manufactured by Mitsubishi Plastics, Inc.).

4) Film-forming Stability

The stability of a bubble for forming a film by an inflation film-forming apparatus, was evaluated.

◎: Extremely stable

○: Stable

Δ: Slightly unstable

X : Impossible to form a film

EXAMPLE 1

A film having a total thickness of 15 μm (5 μm/5 μm/5 μm) was prepared by a coextrusion inflation method to form 5 μm of an interlayer made of a triblock copolymer (Tg: 8° C.) of styrene/isoprene/styrene comprising 20 wt % of styrene and 80 wt % of polyisoprene having a 3,4-bond ratio of 70% and 5 μm each of the front and rear side layers made of a composition having 3.0 parts by weight of diglycerin monooleate added as an antifogging agent to 100 parts by weight of EVA (vinyl acetate contents 15 wt %, MFR at 190° C.=2.0 g/10 min).

The properties measured with respect to the interlayer were as follows:

Storage modulus E' at 0° C.: $1.8 \times 10^{10}$ dyn/cm$^2$

Storage modulus E' at 20° C.: $1.0 \times 10^9$ dyn/cm$^2$

Loss tangent tan δ at 20° C.: 1.30

EXAMPLE 2

Component (A)

Hydrogenated derivative (Tg: −19° C., HSIS) of a triblock copolymer of styrene/isoprene/styrene comprising 20 wt % of styrene and 80 wt % of polyisoprene having a 3,4-bond ratio of 55%: 70 wt %

Component (C)

Cyclopentadiene type hydrogenated petroleum resin (Tg: 81° C., softening temperature: 125° C.): 30 wt %

A film having a total thickness of 15 μm (5 μm/5 μm) was prepared by a coextrusion inflation method to form 5 μm of an interlayer made of a mixed resin composition comprising the above-identified two components and 5 μm each of the front and rear side layers made of the same EVA composition as in Example 1.

The properties measured with respect to HSIS alone were as follows.

Storage modulus E' at 0° C.: $2.0 \times 10^9$ dyn/cm$^2$

Storage modulus E' at 20° C.: $2.1 \times 10^8$ dyn/cm$^2$

Loss tangent tan δ at 20° C.: 0.44

The properties measured with respect to the mixture (interlayer) of HSIS and hydrogenated petroleum resin were as follows.

Storage modulus E' at 0° C.: $1.4 \times 10^{10}$ dyn/cm$^2$

Storage modulus E' at 20° C.: $6.0 \times 10^8$ dyn/cm$^2$

Loss tangent tan δ at 20° C.: 1.20

Tg: 5° C.

EXAMPLE 3

3.0 parts by weight of diglycerin monooleate was added as an antifogging agent to 100 parts by weight of a resin composition prepared by mixing 30 wt % of a propylene/ethylene random copolymer (ethylene content: 4 mol %, MPR at 230° C.=0.5 g/10 min) as component (B) to 70 wt % of the same composition for the interlayer as used in Example 2, and a single layer film having a thickness of 15 μm was prepared from the mixture.

EXAMPLE 4

A film having a total thickness of 15 μm (3 μm/9 μm/3 μm) was prepared by a coextrusion inflation method to form 9 μm of an interlayer made of a resin composition prepared by mixing 30 wt % of a propylene/ethylene random copolymer (ethylene content: 4 mol$, MPR at 230° C.=0.5 g/10 min) as component (B) to 70 wt % of the same composition for the interlayer as used in Example 2, and 3 μm each of the front and rear side layers made of the same EVA composition as used in Example 1.

EXAMPLE 5

Component (D)

Propylene/ethylene/propylene copolymer elastomer (ethylene contents 12 mol %, MPR at 230° C.=1.5 g/10 min) 70 wt %

Component (C)

The same hydrogenated petroleum resin as used in Example 2: 30 wt %

1.5 parts by weight of diglycerin monooleate was added as an antifogging agent to 100 parts by weight of the resin composition comprising the above two components, and a single layer film having a thickness of 15 μm was prepared from the mixture.

The properties measured with respect to component (D) alone were as follows.

Storage modulus E' at 0° C.: $3.6 \times 10^9$ dyn/cm$^2$

Storage modulus E' at 20° C.: $2.1 \times 10^9$ dyn/cm$^2$

Loss tangent tan δ at 20° C.: 0.07
Tg: −25° C.
Quantity of heat for crystallization: 31 J/g

EXAMPLE 6

Component (D)

Propylene/ethylene/propylene copolymer elastomer (ethylene content: 12 mol %, MPR at 230° C.=1.5 g/10 min): 70 wt %

Component (C)

The same hydrogenated petroleum resin as used in Example 1: 30 wt %

A film having a total thickness of 15 μm (2 aμm/11 μm/2 μm) was prepared by a coextrusion inflation method to form 11 μm of an interlayer made of a resin composition comprising the above two components and 2 μm each of the front and rear side layers made of the same EVA composition as used in Example 1.

EXAMPLE 7

A film having a total thickness of 15 μm (3 μm/9 μm/3 μm) was prepared in the same manner as in Example 1 to provide an interlayer (9 μm) made of a resin prepared by mixing 40 parts by weight of liquid polybutene (molecular weight: 500, LV-100, manufactured by Nippon Oil Co., Ltd.) to 100 parts by weight of an ethylene/cyclic olefin copolymer (Tg: 80° C., APEL 6509, manufactured by Mitsui Petrochemical Industries, Ltd.) comprising ethylene and norbornene and 3 μm each of the front and rear side layers made of the same EVA composition as used in Example 1.

The properties measured with respect to the ethylene/cyclic olefin copolymer alone were as follows.

Storage modulus E' at 0° C.: $1.8 \times 10^{10}$ dyn/cm$^2$
Storage modulus E' at 20° C.: $1.8 \times 10^{10}$ dyn/cm$^2$
Loss tangent tan δ at 20° C.: 0.01

Further, the properties measured with respect to the composition prepared by mixing the liquid polybutene to the ethylene/cyclic olefin copolymer were as follows.

Storage modulus E' at 0° C.: $1.2 \times 10^{10}$ dyn/cm$^2$
Storage modulus E' at 20° C.: $2.5 \times 10^{9}$ dyn/cm$^2$
Loss tangent tan δ at 20° C.: 0.60

COMPARATIVE EXAMPLE 1

A film having a total thickness of 15 μm was prepared in the same manner as in Example 1 except that the thickness ratio in Example 1 was changed to 1 μm/13 μm/1 μm

COMPARATIVE EXAMPLE 2

A film having a total thickness of 15 μm was prepared in the same manner as in Example 2 except that the thickness ratio in Example 2 was changed to 1 μm/13 μm/1 μm

COMPARATIVE EXAMPLE 3

A film having a total thickness of 15 μm was prepared to form 5 μm of an interlayer made solely of the same HSIS as used in Example 2 and 5 μm each of the front and rear side layers made of the same EVA composition as used in Example 2.

EXAMPLE 4

A film having a total thickness of 15 μm (5 μm/5 μm/5 μm) was prepared in the same manner as in Example 1 except that as the interlayer, a linear ethylene/butene-1 copolymer (butene-1 content: 14 wt %, density 0.905 g/cm$^3$) was used.

COMPARATIVE EXAMPLE 5

A film having a total thickness of 15 μm (5 μm/5 μm/5 μm) was prepared in the same manner as in Example 1 except that as the interlayer, a hydrogenated derivative (Tg: −42° C., KRATON G1657, manufactured by Shell Chemical) of a triblock copolymer of styrene/butadiene/styrene comprising 13 wt % of styrene and 87 wt % of polybutadiene, was used.

The properties measured with respect to the interlayer were as follows.

Storage modulus E' at 0° C.: $4.0 \times 10^{7}$ dyn/cm$^2$
Storage modulus E' at 20° C.: $3.5 \times 10^{7}$ dyn/cm$^2$
Loss tangent tan δ at 20° C.: 0.05

COMPARATIVE EXAMPLE 6

Evaluation was carried out with respect to a commercially available polyvinyl chloride stretch film (thickness: 15 μm).

With respect to these films, the properties and performance were measured and evaluated. The results are shown in Tables 1 and 2.

The films in the Examples have the viscoelastic properties within the ranges specified by the present invention, and it is evident that they are excellent in the packaging properties.

TABLE 1

|  | 20° C. | | 0° C. | Film-forming stability |
|---|---|---|---|---|
|  | E' | tan δ | E' |  |
| Example 1 | $0.9 \times 10^{9}$ | 0.48 | $6.0 \times 10^{9}$ | ◉ |
| Example 2 | $1.0 \times 10^{9}$ | 0.45 | $6.2 \times 10^{9}$ | ◉ |
| Example 3 | $1.7 \times 10^{9}$ | 0.45 | $1.3 \times 10^{10}$ | ○ |
| Example 4 | $2.0 \times 10^{9}$ | 0.35 | $9.0 \times 10^{9}$ | ◉ |
| Example 5 | $2.0 \times 10^{9}$ | 0.35 | $9.0 \times 10^{9}$ | Δ |
| Example 6 | $1.9 \times 10^{9}$ | 0.30 | $7.4 \times 10^{9}$ | ○ |
| Example 7 | $2.3 \times 10^{9}$ | 0.40 | $6.5 \times 10^{9}$ | ○ |
| Comparative Example 1 | $1.1 \times 10^{9}$ | 1.00 | $1.7 \times 10^{10}$ | Δ |
| Comparative Example 2 | $1.0 \times 10^{9}$ | 1.00 | $1.3 \times 10^{10}$ | Δ |
| Comparative Example 3 | $0.8 \times 10^{9}$ | 0.17 | $3.0 \times 10^{9}$ | ○ |
| Comparative Example 4 | $1.0 \times 10^{9}$ | 0.15 | $2.8 \times 10^{9}$ | ◉ |
| Comparative Example 5 | $0.7 \times 10^{9}$ | 0.10 | $1.9 \times 10^{9}$ | ○ |
| Comparative Example 6 | $1.9 \times 10^{9}$ | 0.35 | $5.5 \times 10^{9}$ | — |

TABLE 2

| | Manual wrapping | | Automatic wrapping | | | Common | | | |
| | Wrinkle freeness | Rupture resistance | Cutting, transportation | Finish | Bottom sealing | Elastic recovery | Tension | Low tempertaure properties | Overall evaulation |
|---|---|---|---|---|---|---|---|---|---|
| Example 1 | ⊙ | ○ | ⊙ | ⊙ | ⊙ | ⊙ | ○ | ⊙ | ⊙ |
| Example 2 | ⊙ | ○ | ⊙ | ⊙ | ⊙ | ⊙ | ○ | ⊙ | ⊙ |
| Example 3 | ○ | ○ | ○ | ⊙ | ⊙ | ⊙ | ⊙ | ○ | ⊙ |
| Example 4 | ⊙ | ⊙ | ⊙ | ⊙ | ⊙ | ⊙ | ⊙ | ○ | ⊙ |
| Example 5 | ⊙ | ⊙ | ⊙ | ⊙ | ⊙ | ○ | ⊙ | ○ | ⊙ |
| Example 6 | ⊙ | ⊙ | ○ | ○ | ⊙ | ○ | ○ | ⊙ | ⊙ |
| Example 7 | ⊙ | ○ | ⊙ | ⊙ | ⊙ | ○ | ⊙ | ⊙ | ⊙ |
| Comparative Example 1 | ⊙ | Δ | Δ | ⊙ | ⊙ | ⊙ | X | X | Δ |
| Comparative Example 2 | ⊙ | Δ | X | ⊙ | ⊙ | ⊙ | X | Δ | X |
| Comparative Example 3 | ○ | ○ | ○ | Δ | Δ | ⊙ | Δ | ⊙ | Δ |
| Comparative Example 4 | ○ | ○ | ○ | Δ | Δ | Δ | ⊙ | ⊙ | Δ |
| Comparative Example 5 | ○ | Δ | ○ | Δ | X | ⊙ | ○ | ⊙ | Δ |
| Comparative Example 6 | ⊙ | ⊙ | ⊙ | ○ | ⊙ | ⊙ | ⊙ | ⊙ | ⊙ |

⊙ Excellent
○ Good
Δ Poor
X Bad

With the stretch film of the present invention, cutting and transportation of the film and wrapping can be conducted without any problem when the film is used for wrapping by e.g. an automatic wrapping machine, and the bottom sealing property is excellent. Further, it is possible to obtain a wrapped product with the film tightly stretched. Thus, it has excellent characteristics which have not been seen with conventional non-vinyl chloride type stretch films.

What is claimed is:

1. A food packaging stretch film free from polyvinyl chloride and having a storage modulus (E') of from $5.0 \times 10^8$ to $5.0 \times 10^9$ dyn/cm$^2$ and a loss tangent (tan δ) of from 0.2 to 0.8, as measured by dynamic viscoelasticity measurement at a frequency of 10 Hz at a temperature of 200° C., which film has at least one layer containing (A) from 20 to 80 wt % of a resin which is a copolymer of a vinyl aromatic monomer with a conjugated diene, or said copolymer which has been hydrogenated, and which resin has a glass transition temperature of at least −20° C. and (B) from 80 to 20 wt % of a propylene-containing polymer.

2. The food packaging stretch film according to claim 1, wherein the copolymer is a triblock copolymer of styrene/isoprene/styrene, wherein the 3,4-bond ratio in the isoprene block is at least 40%.

3. The food packaging stretch film according to claim 1, wherein the at least one layer containing resin (A) also contains (C) a petroleum resin, a terpene resin, a cumarone-indene resin, a rosin or esterified resin, or any of the above resins which have been hydrogenated.

4. The food packaging stretch film according to claim 3, wherein component (C) has a glass transition temperature of from 50 to 100° C.

5. The food packaging stretch film according to claim 1, which is a laminated film with a polyolefin containing resin layer.

* * * * *

UNITED STATES PATENT AND TRADEMARK OFFICE
CERTIFICATE OF CORRECTION

PATENT NO. : 6,187,449 B1
DATED : February 13, 2001
INVENTOR(S) : Hideki Sasaki et al.

It is certified that error appears in the above-identified patent and that said Letters Patent is hereby corrected as shown below:

Column 11,
Line 43, "200°C" should read -- 20°C --.

Signed and Sealed this

Sixth Day of November, 2001

Attest:

NICHOLAS P. GODICI
Attesting Officer   Acting Director of the United States Patent and Trademark Office